United States Patent
Mittelholzer et al.

(10) Patent No.: US 8,578,246 B2
(45) Date of Patent: Nov. 5, 2013

(54) DATA ENCODING IN SOLID-STATE STORAGE DEVICES

(75) Inventors: Thomas Mittelholzer, Zurich (CH); Nikolaos Papandreou, Thalwil (CH); Charalampos Pozidis, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/097,402

(22) Filed: Apr. 29, 2011

(65) Prior Publication Data

US 2011/0296274 A1    Dec. 1, 2011

(30) Foreign Application Priority Data

May 31, 2010  (EP) .................................... 10164495

(51) Int. Cl.
*G11C 29/00* (2006.01)
*H03M 13/00* (2006.01)

(52) U.S. Cl.
USPC ........... 714/773; 714/755; 714/763; 714/766; 714/767; 714/769; 714/774; 714/805

(58) Field of Classification Search
USPC ......... 714/755, 763, 766, 767, 769, 773, 774, 714/805
See application file for complete search history.

(56) References Cited

U.S. PATENT DOCUMENTS

| | | | |
|---|---|---|---|
| 6,504,777 B1 | 1/2003 | Hsu | |
| 7,301,818 B2 | 11/2007 | Lu | |
| 7,515,460 B2 | 4/2009 | Gordon | |
| 8,166,368 B2 * | 4/2012 | Lastras-Montano et al. | 714/763 |
| 2004/0228159 A1 | 11/2004 | Kostylev | |
| 2005/0083726 A1 | 4/2005 | Auclair | |
| 2006/0151849 A1 | 7/2006 | Czubatyj | |
| 2008/0010581 A1 * | 1/2008 | Alrod et al. | 714/763 |
| 2008/0316804 A1 | 12/2008 | Jeong | |
| 2009/0016099 A1 | 1/2009 | Jeong | |
| 2009/0024905 A1 * | 1/2009 | Shalvi et al. | 714/773 |
| 2009/0132758 A1 | 5/2009 | Jiang | |
| 2009/0132895 A1 | 5/2009 | Jiang | |
| 2009/0244964 A1 | 10/2009 | Savransky | |
| 2009/0250677 A1 | 10/2009 | Savransky | |
| 2009/0319872 A1 * | 12/2009 | Alrod et al. | 714/773 |
| 2012/0266046 A1 * | 10/2012 | Thatcher et al. | 714/763 |

OTHER PUBLICATIONS

Thomas M Cover, "Enumerative Source Encoding". IEEE Transactions on Information Theory, vol. 17-19, No. 1, Jan. 1973.

(Continued)

*Primary Examiner* — John J Tabone, Jr.
(74) *Attorney, Agent, or Firm* — Gail H. Zarick; Otterstedt, Ellenbogen & Kammer, LLP (57) ABSTRACT

Methods and apparatus are provided for recording input data in q-level cells of solid-state memory (2), where q>2. Input data words are encoded as respective codewords, each having a plurality of symbols. The coding scheme is such that each symbol can take one of q values corresponding to respective predetermined levels of the q-level cells, and each of the possible input data words is encoded as a codeword with a unique sequence of relative symbol values. The symbols of each codeword are then recorded in respective cells of the solid-state memory by setting each cell to the level corresponding to the recorded symbol value. Input data is thus effectively encoded in the relative positions of cell levels, providing resistance to certain effects of drift noise.

19 Claims, 3 Drawing Sheets

(56) References Cited

OTHER PUBLICATIONS

H.-L.Lou et al. "Increasing storage capacity in multilevel memory cells by means of communications and signal processing techniques" IEE Proc-Circuits Devices Syst, Aug. 2000.

Berger, T "Permutation codes for sources". IEEE Information Theory Society, vol. 18, No. 1 Jan. 1972 (abstract only).

Slepian, D. "Permutation modulation" IEEE, vol. 53, No. 3 Mar. 1965 (abstract only).

Yuval Cassuto, "Codes for Asymmetric Limited-Magnitude Errors with Application to Multi-Level Flash Memories". IEEE Transactions on Information Theory, 56 (4).pp. 1582-1595 2010.

Anxiao (Andrew) Jiang, et al. "Correcting Charge-Constrained Errors in the Rank-Modulation Scheme" IEEE Transactions on Information Theory, vol. 56, No. 5, May 2010.

Anxiao (Andrew) Jiang, et al. "Rank Modulation for Flash Memories". Technical Report. California Institute of Technology, Pasadena, CA. 2008.

Wei Xu,et al. "Using Time-Aware Memory Sensing to Address Resistance Drift Issue in Multi-Level Phase Change Memory". 978-1-4244-6455-5/10 © 2010 IEEE.

* cited by examiner

Figure 1

Permutation Modulation (variant 1) Code

N=16, q=4, symbol values {0, 1, 2, 3}
Initial vector X0 = [0000111122223333]

Codewords:
{ [0000111122223333], [0001011122223333],

[0010011122223333], [0100011122223333],

⋮

[3333222211101000], [3333222211110000] }

} sequences of relative symbol values are unique

Figure 2

| $c^{(j)}$ initial vectors | # $\Pi(c^{(j)})$ |
|---|---|
| $c^{(1)} = [\,0\;0\;0\;0\;1\;2\,]$ | 30 |
| $c^{(2)} = [\,0\;0\;0\;1\;1\;2\,]$ | 60 |
| $c^{(3)} = [\,0\;0\;1\;1\;1\;2\,]$ | 60 |
| $c^{(4)} = [\,0\;1\;1\;1\;1\;2\,]$ | 30 |
| $c^{(5)} = [\,0\;0\;0\;1\;2\;2\,]$ | 60 |
| $c^{(6)} = [\,0\;0\;1\;1\;2\;2\,]$ | 90 |
| $c^{(7)} = [\,0\;1\;1\;1\;2\;2\,]$ | 60 |
| $c^{(8)} = [\,0\;0\;1\;2\;2\;2\,]$ | 60 |
| $c^{(9)} = [\,0\;1\;1\;2\;2\;2\,]$ | 60 |
| $c^{(10)} = [\,0\;1\;2\;2\;2\;2\,]$ | 30 |

| $c^{(k)}$ initial vectors | # $\Pi(c^{(k)})$ |
|---|---|
| $c^{(1)} = [\,0\;0\;0\;0\;1\;2\,]$ | 30 |
| $c^{(3)} = [\,0\;0\;1\;1\;1\;2\,]$ | 60 |
| $c^{(5)} = [\,0\;0\;0\;1\;2\;2\,]$ | 60 |
| $c^{(7)} = [\,0\;1\;1\;1\;2\;2\,]$ | 60 |
| $c^{(8)} = [\,0\;0\;1\;2\;2\;2\,]$ | 60 |
| $c^{(10)} = [\,0\;1\;2\;2\;2\;2\,]$ | 30 |

| $c^{(i)}$ initial vectors | # $\Pi(c^{(i)})$ |
|---|---|
| $c^{(1)} = [\,0\ 1\ 1\ 2\ 2\ 3\ 3\,]$ | 630 |
| $c^{(2)} = [\,0\ 0\ 1\ 1\ 2\ 3\ 3\,]$ | 630 |
| $c^{(3)} = [\,0\ 0\ 0\ 1\ 1\ 2\ 3\,]$ | 420 |
| $c^{(4)} = [\,0\ 1\ 2\ 2\ 3\ 3\ 3\,]$ | 420 |

Figure 7

Figure 8

DATA ENCODING IN SOLID-STATE STORAGE DEVICES

CROSS-REFERENCE TO RELATED APPLICATION(S)

This application claims foreign priority to European Patent application 10164495.3 filed 31 May 2010, the complete disclosure of which is expressly incorporated herein by reference in its entirety for all purposes.

FIELD OF THE INVENTION

This invention relates generally to data encoding in solid-state storage devices (SSSDs), and more particularly to methods and apparatus for encoding and recording data in multi-level SSSD memory cells.

BACKGROUND OF THE INVENTION

Solid-state storage is memory which uses electronic circuitry, typically in integrated circuits, for storing data rather than conventional magnetic or optical media like disks and tapes. Solid-state storage devices such as flash memory devices are currently revolutionizing the data storage landscape. These devices are more rugged than conventional storage devices due to the absence of moving parts, and offer exceptional bandwidth, significant savings in power consumption, and random I/O (input/output) performance that is orders of magnitude better than hard disk drives (HDDs).

In some types of solid-state memory, the fundamental storage unit (the "cell") can be set to only two levels and so can record only binary values. Other types of solid-state memory have so-called "multi-level cells" which can be set to q different levels, where q>2. For example, flash memory and phase change memory (PCM), two important non-volatile memory technologies, permit such multi-level recording. NOR flash memories, for instance, can store 4 levels, i.e. 2 bits, per cell. Multi-level cell (MLC) NAND flash memory chips that can store 4 bits of data per single flash cell using 43 nm process technology are currently available. The PCM technology is expected to supplant flash memory technologies when process technologies below 10 nm are required. Although commercially available PCM chips currently store only one bit per cell, storage of 4 bits per cell in PCM chips has already been experimentally demonstrated.

A challenge in multi-level SSSDs is drift noise. In particular, solid-state memory technologies such as flash and PCM suffer from a phenomenon known as "short-term drift," or simply "drift." In PCM, drift manifests itself as a monotonous increase of the resistance of the stored cell level with time. It is associated with the amorphous phase and is believed to be caused by short-range ordering of defects in the volume of the amorphous part of the cell. Drill of the amorphous or partially amorphous phases can be quite severe in PCM cells. Drift is a particular challenge for multi-level storage in memory cells as it may compromise reliability. Specifically, read-back values of neighboring levels may interfere over time, due to upward drift of the lower level towards the upper one, causing a detection error. The closer the initial spacing between levels the more susceptible they are to drift, so packing higher numbers of levels per cell becomes more difficult and the resulting memory is more prone to errors during cell state detection. On the other hand, packing more bits per memory cell is a key objective for all memory technologies as it is the best known method of reducing manufacturing cost per bit.

There have been a few proposals to tackle the problem of drift, though most remain at the academic interest level. One proposal is to use a certain part of the memory cell array as a reference pool of cells. These cells are written with known signal levels, and are continuously monitored during device operation, to obtain estimates of drift. The estimated drift values can then be used to update the level detection thresholds used to detect stored levels when reading the memory cell array.

Model-based drift cancellation techniques seek to model drift based on key parameters such as temperature, time and wear, and compensate accordingly. It is, however, difficult to obtain an accurate cell history for the key parameters. There are also fluctuations from cell to cell and there is no well-established analytical model available for short-term drift. A model-based approach using time-aware sensing is described in "Using Time-Aware Memory Sensing to Address Resistance Drift Issue in Multi-Level Phase Change Memory," Wei Xu at al., Proc. Int'l Symposium on Quality Electronic Design, 2010. The proposed system keeps track of elapsed time between writing and reading of memory cells and uses this to estimate, and compensate for, the impact of time-dependent drift.

Drift acceleration is another proposal. The idea here is to thermally anneal the cell during programming so that drift, which is thermally activated, can saturate in a short period of time at elevated temperature.

Techniques based on coding have been proposed to address other problems in multi-level memories. For example, "Codes for Asymmetric Limited-Magnitude Errors with Application to Multi-Level Flash Memories," Cassuto et al., Proc. International Symposium on Information Theory, 2007, discusses block codes designed to counter asymmetric noise-induced level shifts in some subset of a group of memory cells. Rank modulation has also been proposed to address endurance problems and overshoot errors in flash memories. This scheme is described in: "Rank Modulation for Flash Memories," Jiang et al., IEEE Trans. Inf. Theory, vol. 55, no. 6, June 2009; and US Patent Application Publications Nos. 2009/0132895A1 and 2009/0132758A1. Rank modulation is also discussed in "Correcting Charge-Constrained Errors in the Rank-Modulation Scheme," Jiang et al., IEEE Trans. Inf. Theory, vol. 56, no. 5, May 2010. As the name suggests, the fundamental principle of rank modulation is to store information in the rank order of a group of memory cells. In particular, stored information is represented by the rank order of a group of n multi level cells, named 1, 2, . . . n, each of which stores a different one of n levels, where cell rank is determined by the stored level in order from highest to lowest. Hence, the cell names 1, 2, . . . n, ordered according to rank, represent symbols of a stored codeword, with the n levels of the cells being used only to determine rank. In this way, the group of n cells can collectively form a virtual q-level cell, with levels 1 to q being defined by different codeword values in the n-cell group.

SUMMARY OF THE INVENTION

One embodiment of an aspect of the present invention provides a method for recording input data in q-level cells of solid-state memory, where q>2. The method comprises:

encoding input data words as respective codewords each having a plurality of symbols, in accordance with a coding scheme wherein each symbol can take one of q values corresponding to respective predetermined levels of the q-level cells, and wherein each of the possible input data words is encoded as a codeword with a unique sequence of relative symbol values; and recording the symbols of each codeword in respective cells of the solid-state memory by setting each cell to the level corresponding to the recorded symbol value.

In recording methods embodying this invention, each input data word may be encoded to produce a codeword with a plurality of (say N) codeword symbols. Each codeword symbol can take one of q values, where there is a predetermined correspondence between these symbol values and the q-levels of the memory cells, and each possible input data word is mapped by the coding scheme to a codeword with a unique sequence of relative symbol values. The N symbols of each codeword may be recorded in respective cells, each of the N cells being set to the level corresponding to the recorded symbol value according to the predetermined correspondence between symbol values and cell levels. Since each possible input data word maps to a codeword with a unique sequence of relative symbol values, each data word may be recorded as a correspondingly unique relative level sequence. Note that it is relative, as opposed to the absolute, symbol values that are critical, i.e. the symbol values relative to some predetermined reference value or sequence, for example the lowest symbol value in a codeword, or zero, or an average or other predefined reference. Particular examples will be discussed further below. According to embodiments of the invention the sequence of relative symbol values in a codeword is unique to a given data word. The relative level sequence representing a recorded codeword is then unique for a given data word. In effect, therefore, the information to be stored may be encoded according to embodiments of the invention in the relative positions of cell levels, and the absolute level positions (e.g. electrical resistance values) may not be critical. Because of this, a substantially uniform shift in all levels (i.e. not changing the basic level order) caused by drift noise may not affect the read-back codeword. Embodiments of this invention may thus provide highly efficient coding and recording systems which may be resistant to drift effects in multi-level solid-state memories.

Note that the symbols of each codeword may be written together to the memory, typically to a localized group of cells such as a set of adjacent cells. At any point in time these cells have a similar history of time and temperature transients, and hence experience similar drift vectors. Recording systems embodying the invention may be thus effective in countering drift.

The q-levels of a cell may not be equally-spaced in terms of the physical quantity, e.g. electrical resistance, which defines the level thresholds. That is, the q-levels may correspond to respective, unequally-spaced values of the physical quantity which is adjustable for the cell to permit setting of the cell to the appropriate value and hence level. The set of levels may be represented, for example, by electrical resistance values on a logarithmic scale. Also, levels in the middle of the range in some systems tend to be subject to more noise than levels towards the ends of the range. To address this, the middle levels may be spaced apart further than other levels.

In some embodiments, the coding scheme may be such that each of the possible input data words is encoded as a codeword with a unique sequence of symbol values relative to the lowest symbol value in the codeword. Examples are coding schemes based on permutation modulation variant 1 codes. The codewords employed may comprise (selected) codewords of a set of (one or more) permutation modulation variant 1 codes. In particular embodiments, however, the codewords comprise codewords of a single permutation modulation variant 1 code. This offers resistance to a particularly broad class of drift as discussed further below.

In other coding schemes, each codeword may comprise a sequence of symbols whose values are symmetrically distributed about a predetermined reference sequence. Each possible input data word is then encoded as a codeword with a unique sequence of symbol values relative to the reference sequence, these relative values being symmetrically distributed about the reference sequence. Examples are coding schemes based on sign-change codes such as permutation modulation variant 2 codes. Here each codeword may comprise a sequence of symbols whose values are symmetrically distributed about an all-zero reference sequence. Other examples are finite reflection group coding schemes. Here each codeword comprises a sequence of symbols whose values are symmetrically distributed about a reference sequence corresponding to a centre of gravity defined for the finite reflection group.

When reproducing recorded data in embodiments of the invention, the sequences of cells recording respective codewords may be read by the read (detection) system. The codeword recorded in a sequence of cells may be identified in dependence on the sequence of relative levels read from those cells, where the reference for the relative levels is determined by the coding scheme as discussed above (e.g. as the lowest level, or the level corresponding to zero, etc). The codewords so identified can then be decoded according to the codeword-to-dataword mapping defined by the coding scheme, thereby to recover the input data words.

An embodiment of a second aspect of the invention provides a computer program comprising program code means for causing a computer to perform a method according to the first aspect of the invention. It will be understood that the term "computer" is used in the most general sense and includes any device, component or system having a data processing capability for implementing a computer program. Moreover, a computer program embodying the invention may constitute an independent program or may be an element of a larger program, and may be supplied, for example, embodied in a computer-readable medium such as a disk or an electronic transmission for loading in a computer. The program code means of the computer program may comprise any expression, in any language, code or notation, of a set of instructions intended to cause a computer to perform the method in question, either directly or after either or both of (a) conversion to another language, code or notation, and (b) reproduction in a different material form.

An embodiment of a third aspect of the invention provides apparatus for recording input data in q-level cells of solid-state memory, where q>2. The apparatus comprises:

an encoder for encoding input data words as respective codewords, each having a plurality of symbols, in accordance with a coding scheme wherein each symbol can take one of q values corresponding to respective predetermined levels of the q-level cells, and wherein each of the possible input data words is encoded as a codeword with a unique sequence of relative symbol values; and a controller for recording the symbols of each codeword in respective cells of the solid-state memory by setting each cell to the level corresponding to the recorded symbol value.

An embodiment of a fourth aspect of the invention provides a solid-state storage device comprising:

solid-state memory having q-level cells, where q>2; and apparatus according to an embodiment of the third aspect of the invention for recording input data in said q-level cells.

In general, where features are described herein with reference to an embodiment of one aspect of the invention, corresponding features may be provided in embodiments of another aspect of the invention.

BRIEF DESCRIPTION OF THE DRAWINGS

Preferred embodiments of the invention will now be described, by way of example, with reference to the accompanying drawings in which.

DETAILED DESCRIPTION OF PREFERRED EMBODIMENTS

Figure 1:
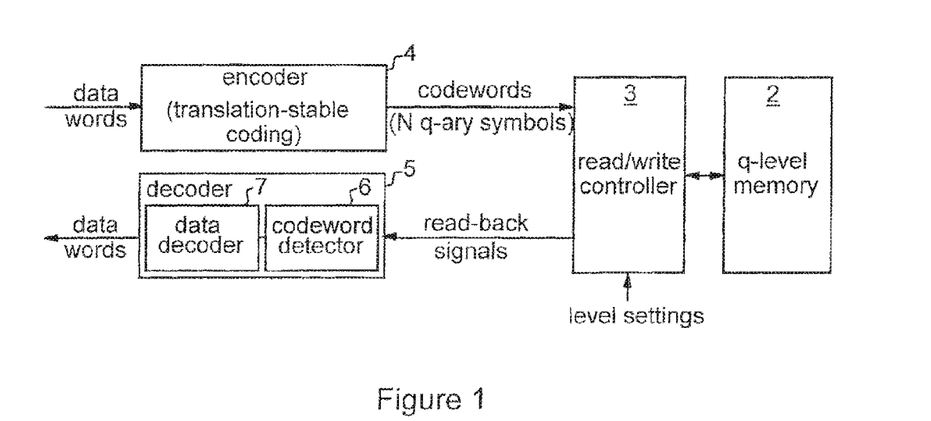
FIG. 1 is a schematic block diagram of a solid-state storage device embodying the invention.

FIG. 1 is a simplified schematic of a solid-state storage device, here a phase-change memory (PCM) device 1, showing elements involved in the data recording/reproduction system to be described. The device 1 includes phase-change memory 2 comprising at least one array of q-level PCM cells. Reading and writing of data to memory 2 is performed by a read/write controller 3. The device includes an encoder 4 for encoding input data words into codewords which are output to read/write controller 3. A corresponding decoder 5, comprising a codeword detector 6 and data decoder 7, receives read-back signals from read/write controller 3 and recovers the original input data words.

Each of the PCM cells in memory 2 can store one of q levels, designated 0 to q-1 for simplicity here. Controller 3 sets a cell to a particular level by adjusting the resistance of the cell in known manner. In particular, levels 0 to q-1 correspond to respective values in a sequence of successively-higher resistance values defined in controller 3. These resistance values are usually unequally-spaced, typically lying in the log domain. The particular resistance values and level spacing can be set as required based on various factors as discussed further below. To read a cell, the controller 3 applies a small probing signal to the cell to determine the cell's resistance, which is a real, possibly quantized value. The resistance values defining the various level settings can be monitored and periodically adjusted by appropriate input to controller 3 as indicated in the figure.

In operation, the input data to be recorded in memory 2 is supplied to encoder 4. The encoder 4 encodes each input data word as a respective codeword which is output to read/write controller 3. The codewords each have N q-ary symbols, where N>q in the preferred examples to be described. Hence, the N symbols of a codeword can each take one of q possible values. The q possible symbol values correspond to respective predetermined levels of the q-level cells represented by real-valued resistance settings as described above. That is, there is a predefined correspondence between symbol values and cell levels. While in theory any arbitrary mapping of symbol values to cell levels is possible, the mapping is preferably order-preserving for the sake of simplicity. In this example, a direct correspondence between symbol value and cell level is assumed for simplicity, whereby symbol value 0 maps to cell level 0, symbol value 1 maps to cell level 1, and so on. Controller 3 records the N symbols of each codeword output by encoder 4 in respective cells of memory 2 by setting each cell according to the corresponding symbol value. Specifically, each cell is set to the level corresponding to the recorded symbol value. (Note that, when setting a cell to a given level, the actual value assumed by the cell may lie within a small interval around the nominal resistance value for the level due to write noise). Each codeword is written to a localised group of cells, typically a group of adjacent cells, in memory 2.

Encoder 4 generates codewords in accordance with a particular type of coding scheme referred to herein as "translation-stable" coding. Examples of these coding schemes will be described in detail below. The key feature of these schemes is that each data word in the set of all possible input data words is encoded as a codeword with a unique sequence of relative symbol values. This is discussed further below in connection with the particular examples. When the resulting codewords are read from memory by controller 3, the real-valued signals indicating the read-back resistance levels of sequences of cells corresponding to respective codewords are supplied to decoder module 5. The codeword detector 6 identifies the codeword recorded in an N-cell sequence in dependence on the sequence of resistance values read from those cells. This process is described further below. Data decoder 7 then decodes the codewords so identified by performing the inverse of the dataword-to-codeword mapping performed in encoder 4, thus recovering the original input data. In general, functionality of encoder 4 and decoder 5 could be implemented in hardware, software or a combination thereof. For example, the operation of these modules could be performed in whole or in part by software which configures a processor of the encoder/decoder to implement the coding/decoding scheme detailed below. Suitable software will be readily apparent to those skilled in the art from the description herein. For reasons of operating speed, however, the use of hardwired logic circuits is generally preferred to implement encoder/decoder functionality as far as possible. Again, suitable implementations will be apparent from the description herein.

Figure 2:
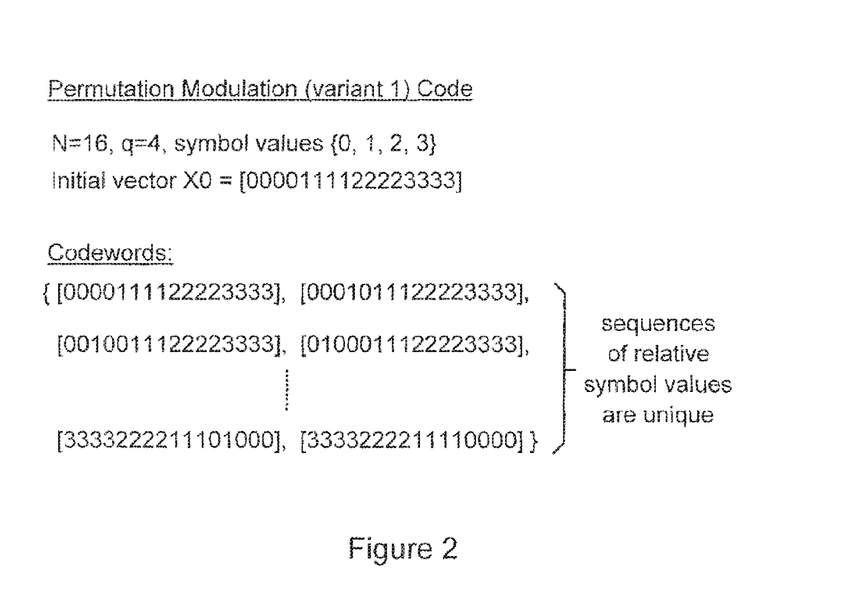
FIG. 2 shows a first example of a coding scheme for use in the FIG. 1 device.

A first example of a translation stable coding scheme for encoder 4 will now be described with reference to FIG. 2. This scheme uses a permutation modulation (variant 1) code. Permutation modulation variant 1 codes were introduced by D. Slepian in "Permutation Modulation," Proc. of the IEEE, March 1965. A variant 1 permutation modulation code is characterized by a real vector of length N (the "initial vector") on which the permutation group of N letters operates. The code is completely determined by its length N and the initial vector X0 which has N real components. The codewords consist of all length N vectors that are obtained through a permutation of the components of the initial vector. FIG. 2 gives an example of such a code with N=16 and q=4. Hence, codewords have sixteen 4-ary symbols with possible values 0, 1, 2, 3. Such a code could therefore be used with memory 2 having 4-ary cells. The initial vector X0 in this example is as shown in the figure. The set of codewords {c} for the code C consists of all possible permutations of the initial vector X0 as indicated in the figure. There are $16!/24^4$ of these codewords, whereby the code has a rate of 1.62 bits/dimension (i.e. bits/cell). Inherent in this code is that each of these codewords has a unique sequence of symbol values relative to the lowest symbol value in the codeword, whereby adding any real-valued number to all symbol values in a codeword does not result in another codeword. In particular, if we define the translation vector t=[1 1 1 ... 1] of length N, here 16, then for all codewords c in the code C:

$$(c+Rt) \cap C = c \quad (1)$$

where R is the set of real numbers. This provides the definition of a "translation-stable" code herein for any N-symbol, q-ary alphabet code $C \subset \{0, 1, \ldots, q-1\}^N \subset R^N$.

With translation-stable codes like the simple example of FIG. 2, because each possible dataword maps to a codeword with a unique sequence of relative symbol values, input data is effectively encoded in the relative, as opposed to the absolute, symbol values. The correspondence between symbol values and memory cell levels means that codewords will be recorded as correspondingly unique sequences of relative levels in memory 2. A fixed shift in all levels does not change the relative level sequences and hence does not affect the information recorded. By detecting the relative level sequences on read-back, the correct codewords and hence data words can be recovered regardless of any drift-induced shift in the cell levels corresponding to a translation by $\mu \cdot$ [1 1 ... 1], $\mu \in R$ as defined above. The recording system is thus resistant to this "type [1 1 ... 1] drift."

While the FIG. 2 coding scheme uses a single permutation modulation variant 1 code, other translation-stable coding schemes can be based on a plurality of such codes. In particular, the set of codewords defining the code C can be selected from the codewords of a plurality of permutation modulation variant 1 codes so as to satisfy the translation-stable requirement defined by equation (1) above. More specifically, given a translation-stable code C we define L unique initial vectors $c^{(1)}, \ldots, c^{(L)}$, each of which has lexicographically-ordered components $c_1^{(j)} \leq c_2^{(j)} \leq \ldots \leq c_N^{(j)}$, such that the translation-stable code C for use in encoder 4 is contained in the union of the corresponding permutation modulation codes, i.e.:

$$C \subset \checkmark(c^{(1)}) \cup \checkmark(c^{(2)}) \ldots \cup \checkmark(c^{(L)}) \quad (2)$$

where $\checkmark(c^{(j)})$ denotes the permutation modulation code with initial vector $c^{(j)}$ and $C \cap \checkmark(c^{(j)}) \neq \emptyset$. Note that individual initial vectors $c^{(1)}, \ldots, c^{(L)}$ need not contain all q symbol values, though all q values must appear in the set of initial vectors as a whole, and the condition for translation-stability given by equation (1) must be satisfied by the overall codeword set. Specific examples of such coding schemes will be given below.

The mapping of input data words into codewords can be implemented in encoder 4 using a look-up table, in particular for small permutation modulation codes. For more efficient operation with large codes, encoder 4 can employ enumerative source coding. This is a well-known encoding technique (see, for example, T. Cover, "Enumerative Source Encoding," IEEE IT-1973, and T. Berger et al., "Permutation codes for sources" IEEE IT-18. January 1972), and suitable implementations in encoder 4 will be apparent to those skilled in the art.

Considering, now decoder 5, the operation for an encoding scheme using a single permutation modulation code $\checkmark(c^{(j)})$ will be addressed first. During read-back, controller 3 reads the sequences of cells recording respective codewords and generates a real-valued read-back signal for each cell. The resulting read-back signal for a codeword $y=[y_1, y_2, \ldots, y_N]$ is supplied to codeword detector 6. The codeword detector first orders components of y to obtain: $y_{i1} \leq y_{i2} \leq \ldots \leq y_{iN}$. The ordering process involves a permutation of the received signal components defined by (k1, k2, ..., kN). Next, detector 6 simply applies the inverse of this permutation to the components of initial vector $c^{(j)}$, thereby obtaining the codeword $x=[c_{k1}^{(j)}, c_{k2}^{(j)}, \ldots, c_{kN}^{(j)}]$. Thus, the codeword is identified based on the ordering of the read-back signal components, and hence on the relative, rather than absolute, signal levels. Specifically, it is the sequence of relative levels read from the N-cell sequence that determines the detected codeword. The resulting codeword x is output to data decoder 7 which is implemented as the inverse of encoder 4, performing the inverse of the dataword-to-codeword mapping, thereby to recover the original input data.

Since the ordering operation on the components of the read-back signal y is invariant to an identical shift of all levels, the decoding may be unaffected by such identical all-level shifts. An even stronger invariance property may hold: if the drift on nominal levels L1, L2, ..., Lk (L1<L2<...<Lk) is such that their order is preserved at read-back time t, i.e. L1(t)<L2(t)<...<Lk(t), then the decoding is invariant under this drift. The decoding process described above may achieve maximum-likelihood (ML) decoding for channels with drift of the nature described above and "reasonable" additive noise (i.e. additive noise with a noise density that decreases with increasing Euclidean norm of the error).

The operation of decoder 5 for an encoding scheme based on a union of permutation modulation codes will now be described. For such an encoding scheme as defined above, consider the normalized initial vectors $c'^{(1)}, \ldots, c'^{(L)}$ with components given by:

$$c'_k{}^{(j)} = c_k{}^{(j)} - 1/N \Sigma_{i=1 \ldots N} c_i{}^{(j)}.$$

Note that the normalized initial vectors lie in the hyperplane H orthogonal to [1 1 ... 1]. The read-back signal $y=[y_1, y_2, \ldots, y_N]$ for a codeword is supplied to codeword detector 6 as before. As a first step, the codeword detector projects y onto the hyperplane H to obtain the projection y'=proj(y). This step corresponds to the normalization process defined above for the initial vectors. In a second step, detector 6 orders the components of y' to obtain: $y'_{i1} \leq y'_{i2} \leq \ldots \leq y'_{iN}$. Again, this ordering process involves a permutation of the received signal components defined by (k1, k2, ..., kN). In a third step, detector 6 finds (one of) the closest normalized initial vector $c'^{(j)}$ to the reordered received signal $[y'_{i1}, y'_{i2}, \ldots, y'_{iN}]$. (If there is more than one closest vector here, one can choose the closest by coin-tossing or any other predetermined selection rule). In a fourth step, the codeword detector applies the inverse of the aforementioned permutation to the components of the selected initial vector $c^{(j)}$ to obtain the codeword $x=[c_{k1}^{(j)}, c_{k2}^{(j)}, \ldots, c_{kN}^{(j)}]$. Again, therefore, codewords are detected based on the sequence of relative levels in the read-back signal. The resulting codeword is then decoded by data decoder 7 to obtain the original data word as before.

The decoding process for the union of permutation modulation codes achieves maximum-likelihood (ML) decoding for type-[1 1 ... 1] drift and reasonable additive noise as described above. However, for systems using the first-described decoding process based on codes that are subcodes of a single permutation modulation code (with a single initial vector), the scheme is not only invariant to type-[1 1 ... 1] drift but to a much broader class of time-dependent drift models, such as drift modeled in the log-domain by $\log R(t) = a(t) \log R_{ref} + b(t)$, where a(t) and b(t) are both either monotonically increasing or decreasing functions. With both decoding processes, if errors result in a detected vector x which is not a codeword, an erasure symbol can be output by detector 6 as usual. Various known outer error-correction coding techniques might be employed, in addition to the above processes which can be considered to be inner coding schemes, to deal with such errors. Such techniques will be apparent to those skilled in the art and need not be described further here.

Examples of specific translation-stable codes for use in device 1 will now be described with reference to FIGS. 3 to 7.

Figure 3:
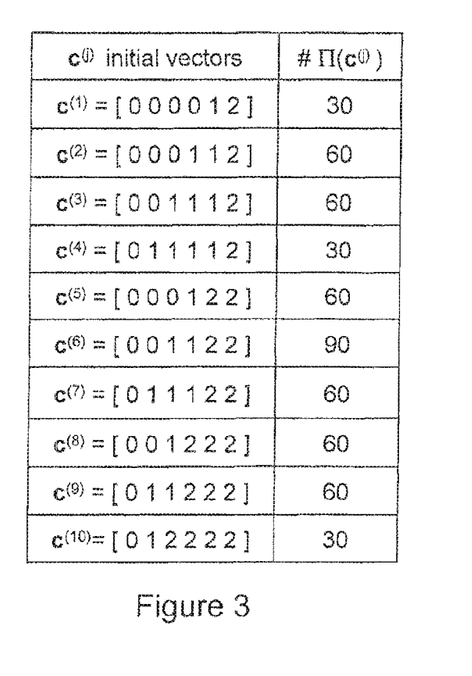
FIG. 3 illustrates construction of a second exemplary coding scheme for use in the FIG. 1 device.
Figure 4:
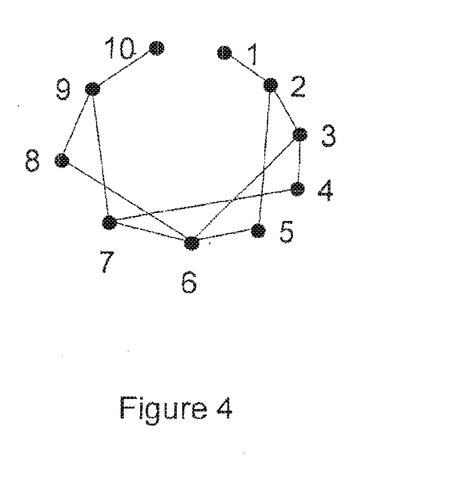
FIG. 4 shows a minimum-distance graph of initial vectors in the coding scheme of FIG. 3.

FIG. 3 illustrates construction of a translation-stable code with q=3 and N=6. The code is based on the union of ten permutation modulation codes with initial vectors $c^{(j)}$ as shown in the figure. There are 540 codewords satisfying the translation-stable condition obtained from permutations of these initial vectors. A subcode with 512 codewords has a rate of 1.5 bit/cell. FIG. 4 shows the minimum-distance graph of initial vectors in this coding scheme, where vertices represent initial vectors $c^{(j)}$ and an edge is shown from j to k if $c^{(j)}$ and $c^{(k)}$ are at Euclidean distance 1. The minimum (Euclidean) distance within each of the ten permutation modulation subcodes is $\sqrt{2}$, and the minimum (Euclidean) distance between the permutation modulation subcodes is 1. The code rate of 1.5 bit/cell is close to the maximum possible rate of $\log_2(3)$= 1.585, and thus the code achieves an efficiency of 0.9464.

Figure 5:
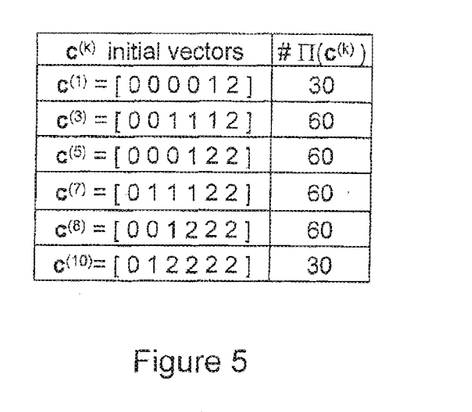
FIG. 5 illustrates construction of a third exemplary coding scheme for the FIG. 1 device.

The code of FIGS. 3 and 4 has minimum (Euclidean) distance 1, which is the same as uncoded signaling. To increase the minimum (Euclidean) distance, one can consider a subcode whose defining initial vectors have at least minimum distance $\sqrt{2}$. A collection of such initial vectors can be obtained from the minimum-distance graph of initial vectors: each vertex in that collection must not be connected to any other such vertex by an edge. These initial vectors are indicated in the table of FIG. 5 and correspond to vertices marked with crosses in the minimum distance graph of FIG. 6. This code has 300 codewords and has minimum (Euclidean) distance $\sqrt{2}$. A subcode with 256 codewords has a rate of 4/3 bit/cell.

Figure 7:
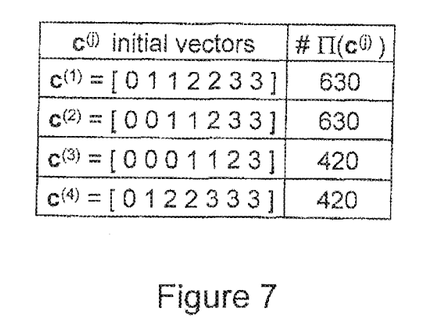
FIG. 7 illustrates construction of a fourth exemplary coding scheme for the FIG. 1 device.

FIG. 7 illustrates construction of a translation-stable code with q=4 and N=7. The code is based on the union of four permutation modulation codes with initial vectors $c^{(1)}$ as shown in the figure. There are 2100 codewords, which corresponds to a rate of 1.5766 bit/cell, and the code has minimum distance $d_{min}=\sqrt{2}$. A subcode with 2048 codewords has rate 11/7=1.5714 bit/cell, as compared with uncoded transmission which has rate of 2 bit/cell but is of course vulnerable to drift.

Figure 6:
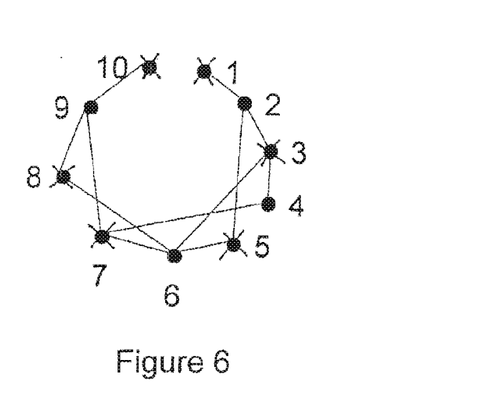
FIG. 6 shows a minimum-distance graph of initial vectors in the FIG. 5 coding scheme.

The approach to construction of translation-stable codes followed in the above examples can be extended to any number of levels q and any dimension N. When optimizing for rate as in the example of FIGS. 3 and 4, one typically chooses small lengths N and does not increase the minimum distance beyond the uncoded case. In the example of FIGS. 5 and 6, the squared minimum Euclidean distance of 2 corresponds to a 3 dB gain in SNR (signal-to-noise ratio). The concept of a minimum-distance graph of initial vectors extends to any q and N, and thus allows one easily to construct codes with 3 dB coding gains. For instance, two codes with $d_{min}=\sqrt{2}$ can be constructed with parameters (q=4, N=10, rate=1.7) and (q=8, N=18, rate=2.5) respectively.

Figure 8:
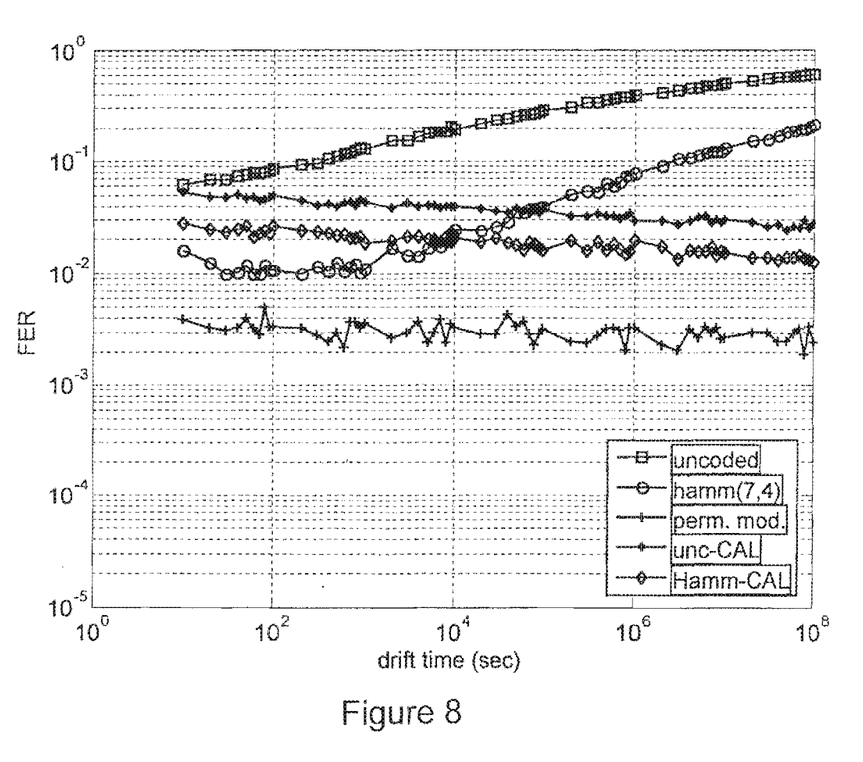
FIG. 8 is a graph comparing performance of an embodiment of the invention with various alternative systems.

FIG. 8 shows the results of simulations comparing performance of the FIG. 7 code with various other techniques under the effects of drift noise plus AWGN (additive white Gaussian noise) and Wiener noise. The eight nominal resistance levels were uniformly spaced in $\log_{10}(R)$ between 1e3 and 1e6 Ohms. A simple power law drift model $R(t)=Rref(t/t0)^\gamma$ was employed with drift exponent $\gamma$ dependent on the resistance level. AWGN was applied in the $\log_{10}(R)$ domain with a standard deviation of the noise ($\sigma$), which depends on the distance between levels, Rdist, i.e., the signal-to-noise ratio was given by SNR=20 $\log_{10}$(Rdist/$2\sigma$). In addition, Wiener noise was added by applying the Wiener process (with step size=0.02) in the log 10-domain to the drifted, noisy levels. The FIG. 8 plot shows the frame error rate (FER) (where "frame" denotes codeword in this case) against drift time for the translation-stable code of FIG. 7 (trace labeled "perm-.mod"). The upper trace in the figure (labeled "uncoded") shows the corresponding results with no coding. The trace labeled "hamm(7,4)" shows results obtained using a (7, 4) Hamming code in the construction of asymmetric limited-magnitude error correcting codes as described in the Cassuto et al. reference above. The remaining two traces, labeled "unc-CAL" and "Hamm-CAL" show the results for no-coding and the (7, 4) Hamming code based scheme respectively but with a genie performing a model-based correction for the deterministic drift component similar to that described in the Xu et al., reference above. Note that this is a fair comparison, as both the translation stable code used, and the (7,4) Hamming code, have the same coding rate, equal to 11/7 bits/cell. This figure demonstrates the effectiveness of the translation-stable coding scheme described herein.

It will be seen that the problem of drift is addressed in embodiments of the invention by efficient coding schemes which are designed to be largely insensitive to drift. The embodiments described may provide efficient, drift-invariant recording/reproduction systems for multi-level solid-state memories. The coding schemes may be robust to statistical fluctuations characteristic of drift and to variability between cells. In particular, the schemes described may be completely invariant to any (time-varying) level shift which is identical for all levels (corresponding to type-[1,1, . . . , 1] drift as described above). With this type of drift and any "reasonable" additive noise, the decoder may be a maximum-likelihood decoder and may be therefore optimum. Moreover, as discussed earlier, some schemes may provide resistance to even broader types of drift. The schemes according to embodiments of the invention may be implemented without knowledge of drift characteristics, though knowledge of rudimentary drift statistics might be employed if desired to further improve performance, for example to compensate for level-dependent drift characteristics. Moreover, no thermal treatment of cells may be needed. Cells of a translation-stable codeword may be efficiently recalibrated periodically because all cells are written and read at the same time and thus experience similar drift noise.

According to embodiments of the invention initial system parameters may be selected to enhance performance. The codeword set and resistance level settings may be optimized with respect to known drift characteristics and data-dependent write noise. For example, the average frequency of the levels in a certain range can be selected by suitably choosing the initial vector(s). For instance, certain critical levels (such as lowest or highest resistance values) can be chosen to occur less frequently. In general, resistance level settings may be set as desired in dependence on system characteristics. The separation of middle levels, for example, may be increased compared to other levels to reduce sensitivity to noise.

It will of course be appreciated that many changes and modifications can be made to the particular embodiments detailed above. For example, while the exemplary coding schemes described are based on permutation modulation variant 1 codes, embodiments with translation-stable coding schemes based on other types of code can be readily envisaged by applying the principles explained above. In particular, while the codewords in the permutation modulation variant 1 systems above have unique sequences of symbol values relative to the lowest symbol value, in other coding schemes codewords may have unique sequences of symbol values relative to some other predetermined reference. One example is provided by coding schemes based on sign-change codes such as permutation modulation variant 2 codes. These codes are based on permutations of positive and negative symbol values which are symmetrically distributed about zero. In translation-stable schemes based on such sign-change codes, therefore, each possible input data word can be encoded as a codeword with a unique sequence of symbol values relative to, and symmetrically distributed about, zero. Another example is provided by coding schemes based on finite reflection groups. As is well known in the art, these codes are generated from the finite set of isometries on a geometrical object such as an n-dimensional lattice or a regular n-dimensional body which map the object onto itself. Each codeword in the resulting code comprises a sequence of symbols whose values are symmetrically distributed about a reference sequence corresponding to a centre of gravity of the object that is left invariant by the finite reflection group. In translation-stable schemes based on these codes, therefore, each possible input data word can be encoded as a codeword with a unique sequence of symbol values relative to, and symmetrically distributed about, the reference sequence corresponding to a centre of gravity. For these sign-change and finite reflection group coding schemes, the codeword detector 6 in the FIG. 1 system can be adapted to perform a simple precomputation of the reference for the read-back signal components (i.e. the zero level for sign-change codes and the centre of gravity for finite reflection codes). This precomputation uses side information about drift in determining the reference level. The side information can be obtained, for example, using reference cells. For instance, a reliable zero reference level may be obtained by averaging the values read from a set of reference cells containing all levels in equal multiplicity. The resulting reference may then used by codeword detector 6 to detect the unique relative level sequence corresponding to a codeword. Suitable implementations of such alternative schemes will be readily apparent to those skilled in the art.

It will of course be appreciated that many other changes and modifications can be made to the embodiments described without departing from the scope of the invention.

What is claimed is:

1. A method for recording input data in q-level cells of solid-state memory, where q>2, the method comprising:
encoding each of a plurality of input data words as a respective codeword comprising a unique sequence of relative symbol values in accordance with a coding scheme, wherein each of said symbol values takes a q value corresponding to a respective predetermined level of the q-level cells; and
recording each of said symbol values of each of said codewords in a respective q-level cell of the solid-state memory by setting each of said respective q-level cells to the level corresponding to a recorded symbol value.

2. The method according to claim 1, wherein each of the plurality of input data words is encoded as a given one of said codewords comprising said unique sequence of relative symbol values relative to a lowest one of said symbol values in said respective codeword.

3. The method according to claim 2, wherein said codewords comprise codewords of a set of permutation modulation variant 1 codes.

4. The method according to claim 3, wherein said codewords comprise codewords of a single permutation modulation variant 1 code.

5. The method according to claim 1, wherein each codeword comprises the unique sequence of relative symbol values whose values are symmetrically distributed about a predetermined reference sequence.

6. The method according to claim 4, wherein said coding scheme comprises a sign-change coding scheme wherein values of the unique sequence of relative symbol values of each codeword are symmetrically distributed about an all-zero reference sequence.

7. The method according to claim 4, wherein said coding scheme comprises a finite reflection group coding scheme wherein values of the unique sequence of relative symbol values of each codeword are symmetrically distributed about a reference sequence corresponding to a centre of gravity defined for the finite reflection group.

8. The method according to claim 1, including recording each of the symbol values of each codeword in a localized group of said cells.

9. The method according to claim 1, wherein the q-levels of a given one of said cells correspond to respective, unequally-spaced values of a physical quantity which is adjustable for the given one of said respective q-level cells.

10. The method according to claim 1 wherein each codeword has N symbols, where N>q.

11. The method according to claim 1, further comprising:
reading the sequences of cells recording respective ones of the codewords;
identifying the codeword recorded in a given one of said sequences of cells in dependence on a sequence of relative levels read from those cells; and
decoding the codewords so identified to recover the corresponding input data words, wherein said decoding is invariant to an identical shift of all said q-level cells of the solid-state memory.

12. The method according to claim 1, wherein each of said codewords corresponds to a plurality of sequences of absolute symbol values, wherein said plurality of sequences of absolute symbol values of a given codeword of said codewords corresponds to said unique sequence of relative symbol values of said given codeword.

13. An article of manufacture comprising a computer program product for causing a processor of a solid state storage device to perform a method for controlling recording of input data in q-level cells of solid-state memory of the device, where q>2, said computer program product comprising:
a tangible computer-readable storage medium, storing computer readable program code on a non-transitory computer-readable storage medium comprising:
computer readable program code configured to encode each of a plurality of input data words as a respective codeword comprising a unique sequence of relative symbol values in accordance with a coding scheme, wherein each of said symbol values takes a q value corresponding to respective predetermined levels of the q-level cells; and
computer readable program code configured to supply said symbol values of each of said codewords for recording in a respective q-level cell of the solid-state memory by setting each of said respective q-level cells to the level corresponding to a recorded symbol value.

14. The article of manufacture of claim 13, wherein each of said codewords corresponds to a plurality of sequences of absolute symbol values, wherein said plurality of sequences of absolute symbol values of a given codeword of said codewords corresponds to said unique sequence of relative symbol values of said given codeword.

15. An apparatus for recording input data in q-level cells of solid-state memory, where q>2, the apparatus comprising:
an encoder configured to encode each of a plurality of input data words as a respective codeword comprising a unique sequence of relative symbol values in accordance with a coding scheme, wherein each of said symbol values takes a q value corresponding to respective predetermined levels of the q-level cells; and a controller configured to record each of said symbol values of each of said codewords in a respective q-level cell of the solid-state memory by setting each of said respective q-level cells to the level corresponding to a recorded symbol value;

wherein said encoder comprises at least one of:

encoder hardwired logic circuitry, and encoder software, stored in a non-transitory computer-readable storage medium, executing on at least one hardware processor.

16. The apparatus according to claim 15, wherein:

the controller is configured to read the sequences of cells recording the respective codewords; and the apparatus further comprises a decoder configured to:

identify the codeword recorded in a given one of said sequences of cells in dependence on a sequence of relative levels read from those cells, and decode codewords so identified to recover the corresponding input data words:

wherein said decoder comprises at least one of:

decoder hardwired logic circuitry, and decoder software, stored in a non-transitory computer-readable storage medium, executing on said at least one hardware processor.

17. The apparatus according to claim 15, wherein each of said codewords corresponds to a plurality of sequences of absolute symbol values, wherein said plurality of sequences of absolute symbol values of a given codeword of said codewords corresponds to said unique sequence of relative symbol values of said given codeword.

18. A solid-state storage device comprising:

solid-state memory having q-level cells, where q>2;

an encoder configured to encode each of a plurality of input data words as a respective codeword comprising a unique sequence of relative symbol values in accordance with a coding scheme, wherein each of said symbol values takes a q value corresponding to respective predetermined levels of the q-level cells; and a controller configured to record each of said symbol values of each of said codewords in a respective q-level cell of the solid-state memory by setting each of said respective q-level cells to the level corresponding to a recorded symbol value;

wherein said encoder comprises at least one of:

encoder hardwired logic circuitry, and encoder software, stored in a non-transitory computer-readable storage medium, executing on at least one hardware processor.

19. The solid-state storage device of claim 18, wherein each of said codewords corresponds to a plurality of sequences of absolute symbol values, wherein said plurality of sequences of absolute symbol values of a given codeword of said codewords corresponds to said unique sequence of relative symbol values of said given codeword.

* * * * *